Feb. 11, 1930.  C. S. BOUSUM  1,746,633
SWITCHBOARD PANEL WIRING
Filed March 21, 1927
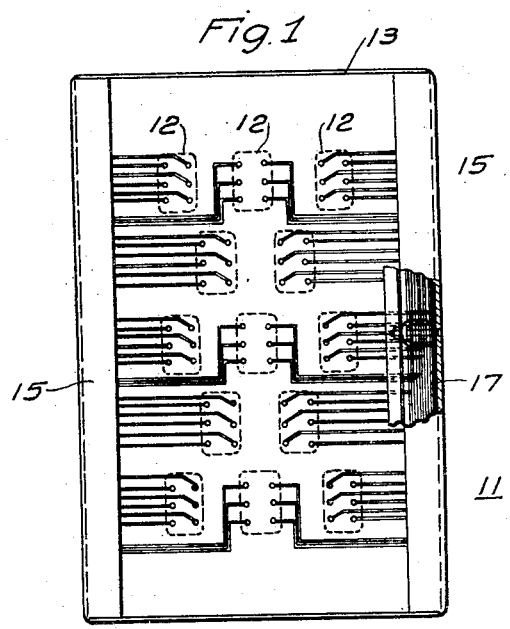
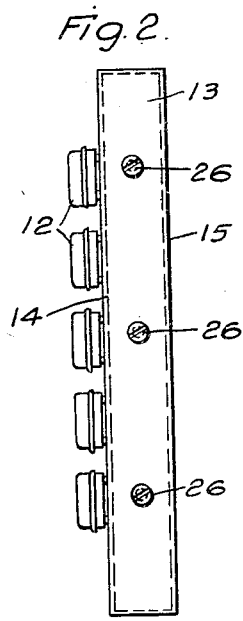
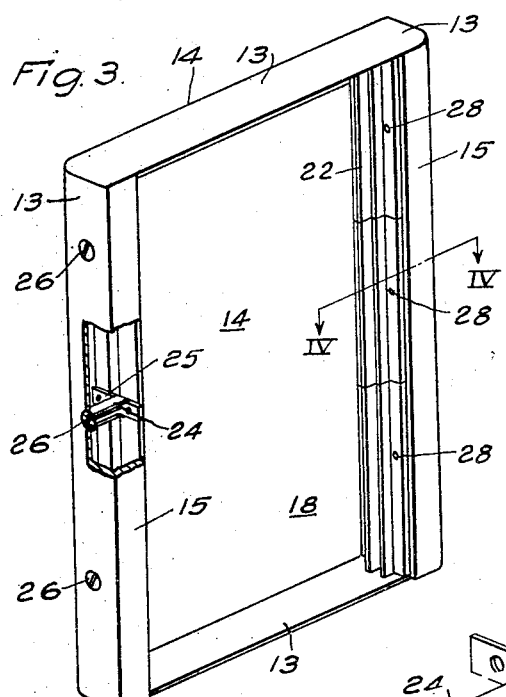
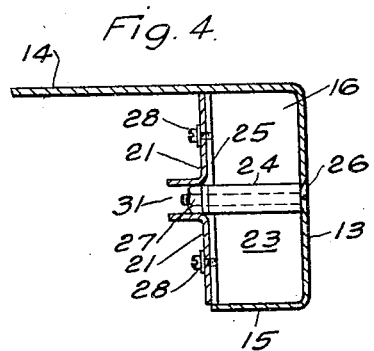
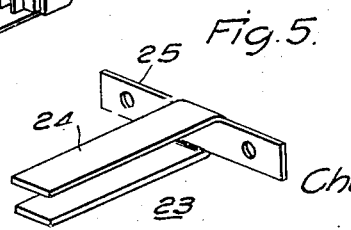
INVENTOR
Charles S. Bousum.
BY
ATTORNEY Patented Feb. 11, 1930

1,746,633

UNITED STATES PATENT OFFICE

CHARLES S. BOUSUM, OF EAST PITTSBURGH, PENNSYLVANIA, ASSIGNOR TO WESTINGHOUSE ELECTRIC & MANUFACTURING COMPANY, A CORPORATION OF PENNSYLVANIA

SWITCHBOARD-PANEL WIRING

Application filed March 21, 1927. Serial No. 176,855.

My invention relates to switchboard construction and particularly to concealed wiring therefor.

One object of my invention is to provide a switchboard panel comprising a unitary member for supporting electrical apparatus having its edges terminating in a U-shape form for disposing conductors that are to be connected to the electrical apparatus.

Another object of my invention is to provide a unitary metallic member for supporting electrical apparatus, the edges of the member being bent at substantially right angles to the plane of the member and terminating in inwardly bent portions to form channels in which are disposed conductors that are to be connected to the electrical apparatus.

Another object of my invention is to provide a switchboard panel comprising a unitary metallic member for supporting electrical mechanism and having integral means for disposing conductors that are to be connected to the electrical mechanism.

Another object of my invention is to provide a unitary metallic member for supporting electrical apparatus having one or more of its edges terminating in a channel which is adapted to contain the conductors to be connected to the electrical apparatus thus producing an arrangement of a neat appearance and compact structure.

Heretofore, it has been the general practice to dispose the conductors on the back of the switchboard panel or to provide a separate compartment or conduit adjacent to the panel to receive them. Such constructions are undesirable in view of the complex appearance or the requirement of additional space to accommodate adjacent compartments or conduits, and I have, accordingly, provided a unitary metallic member having one or more of its edges terminating in channel form which serves the double purpose of so strengthening the metallic member as to render it self-supporting and of affording a compartment, in the form of a channel well, to contain the usual conductors connected to such apparatus as may be disposed on the member.

My invention provides a desirable compact arrangement for the conductors and is neater in appearance than the constructions that have been heretofore employed.

Another object of my invention is to provide a switchboard panel comprising a self-supporting unitary metallic member for supporting electrical apparatus, the edges of which are bent up to form a channel to enclose conductors to be connected to the electrical apparatus, with conductor-retaining means of such type as to facilitate installation and to permit easy access to the conductors for inspection and repair.

Another object of my invention is to provide a unitary metallic member for supporting electrical apparatus, the edges of which are bent up to form a channel to enclose conductors to be connected to the electrical apparatus, and with a cover for the channels comprising a plurality of sections, each section consisting of a pair of angle plates oppositely disposed and spaced apart to provide an open stop through which the conductors may extend from the channel to the terminals of the various pieces of apparatus mounted on the panel.

It is a further object of my invention to provide a unitary metallic member of the above form comprising a plurality of sections of such pairs of angularly disposed and spaced-apart plates which may be easily removed for inspection of the channel.

These and other objects, that may become apparent through the further description of my invention, are attained by the apparatus hereinafter described, and illustrated in the accompanying drawings, wherein, Figure 1 is a rear view, in elevation, partly in section, of a switchboard panel embodying my invention.

Fig. 2 is a side view, in elevation, of a switchboard panel embodying my invention.

Fig. 3 is a perspective view, partially in section, of a switchboard panel embodying my invention.

Fig. 4 is a sectional view taken along the line IV—IV of Fig. 3, and

Fig. 5 is an enlarged detail, perspective view embodying my invention.

In practicing my invention, I provide a unitary metallic member 11 for supporting electrical apparatus 12, the edges 13 of the member being bent at substantially right angles to the plane of the main portion 14 and one or more of these edges terminating in inwardly bent portions 15 to form channels 16, in which are disposed electrical conductors 17 connected to the electrical apparatus 12, and a closing means 18 for the channels 16.

Referring to the drawings, the switchboard panel comprises a unitary metallic member 11, the edges 13 of the member 11 being bent at substantially right angles to the plane of the main portion and the side edges 13 terminating in an inwardly bent portion 15 bent substantially parallel to the plane of the main portion 11, thus forming a channel of U-shape on the side edges of the member 11.

Referring to Fig. 1, electrical apparatus that may be required for any installation is disposed on the main body portion 14 of the member 11, as indicated at 12. The conductors 17 for connection to electrical apparatus 12 are disposed in the channel 16 and may be led out for connection to their respective pieces of apparatus.

A cover 18 is provided for retaining the conductors in position within the channel 16. The cover comprises a pair of angle plates 21 which are spaced apart with their upright portions opposing, thus leaving a slot 31 extending lengthwise of the inner wall of the channel through which the conductors therein may project for connection to the proper apparatus terminals. The plates 21 are divided into sections 22, as shown in Fig. 3, so that, by removing the plates 21 from the sections 22, the conductors may be rendered accessible for inspection and repair.

The plates 21, constituting the cover 18, are held rigidly in place to cover the channel by fastening means 23.

Referring to Figures 4 and 5, the fastening means 23 comprises a member 25 having an integral U shaped portion 24. The member 25 is attached to the member 11 in a suitable manner such as welding to the inwardly bent portion 15 and main body portion 14 thereby effectively securing the conductors 17 in the channels 16. The plates 21 constituting the cover 18 are fastened to the members 25 by any suitable means such as screws 28. The conductors 17 extend through the opening 31 afforded by the space between the plates 21 for connection to the respective electrical apparatus. The plates are designed in angular form and serve the double purpose of affording a means of anchoring the conductors in that it provides a convenient member for supporting conductor cleats and secures additional stiffness to secure the conductors in position.

Referring to Figure 4, I provide a bolt 26 and nut 27 extended through the edge 13 and member 25 for further securing the fastening means 23. The bolt 26 is disposed in the space provided between the arms of the U shaped portion 24 thereby preventing the bolt 26 from interfering with the conductors. A space for bolting adjacent panels together without disturbing the conductors is provided between the arms of the U shaped portion 24 of the member 23. For the bolt 26 may be substituted an extension bolt (not shown) for bolting adjacent panels together.

When it is desired to inspect the conductors in any portion of the channel, it is only necessary to remove one or both plates 21 covering the respective sections, by loosening the machine screws or bolts 28.

Accordingly, I have provided a unitary metallic member for supporting electrical apparatus having its edges bent up to form a channel, conductors disposed in the channel for connection to the electrical apparatus and closing means, for the channel said closing means being subdivided into sections for rendering easy access to any portion of the channel for inspection or repair of the conductors disposed therein.

While I have described and illustrated one embodiment of my invention, it will be apparent to those skilled in the art that various changes, modifications, substitutions, additions and omissions may be made in the apparatus above described without departing from the spirit and scope of the appended claims.

I claim as my invention:

1. In an electrical device, a unitary metallic switchboard panel member for supporting electrical apparatus, the edges of the member being bent at substantially right angles to the main portion of the member and terminating in inwardly bent portions to form channels in which are disposed conductors connected to the electrical apparatus, and closing means extending between the bent portion and the main portion for partially closing the channels.

2. In an electrical device, a unitary metallic switchboard panel member for supporting electrical apparatus, the edges of the member being bent at substantially right angles to the main portion of the member and terminating in inwardly bent portions to form channels in which are disposed conductors connected to the electrical apparatus, and a detachable cover extending between the bent portion and the main portion adapted to partially close the channels and having means for connecting it to said channels.

3. In an electrical device, a unitary metallic switchboard panel member for supporting electrical apparatus, the edges of the member being bent at substantially right angles to the main portion of the member and terminating in inwardly bent portions to form channels in which are disposed conductors connected to the electrical apparatus, and a cover extending between the bent portion and the main portion comprising a pair of angular, oppositely disposed and spaced apart plates for permitting conductors to extend to the apparatus.

4. A panel board composed of a unitary metallic switchboard panel member for supporting electrical mechanism, the edges of the member being bent at substantially right angles to the main body and terminating in inwardly bent portions forming channels in which are disposed conductors connected to the electrical apparatus, and a metallic cover extending between the bent portion and the main portion comprising a pair of angular, oppositely disposed, and spaced apart plates for permitting the conductors to extend therebetween to the respective mechanisms.

In testimony whereof, I have hereunto subscribed my name this 17th day of March, 1927.

CHARLES S. BOUSUM.